(12) United States Patent
Coffin et al.

(10) Patent No.: US 7,552,250 B2
(45) Date of Patent: Jun. 23, 2009

(54) DMA SLOT ALLOCATION

(75) Inventors: Barry K. Coffin, Nashua, NH (US);
Anne Bavazzano-Desbrieres,
Champagnier (FR); Michele Prieur,
Champagnier (FR); **Jean-Alexis
Berranger, Meyelan (FR); Douglas C.
Ferrin, Derry, NH (US); Mark E.
Somerville**, Merrimack, NH (US);
Richard D. Ellison, Maynard, MA (US);
Christophe Gavrel, Le Cannet (FR)

(73) Assignee: **Hewlett-Packard Development
Company, L.P.**, Houston, TX (US)

( * ) Notice: Subject to any disclaimer, the term of this patent is extended or adjusted under 35 U.S.C. 154(b) by 318 days.

(21) Appl. No.: 11/702,808

(22) Filed: Feb. 6, 2007

(65) Prior Publication Data

US 2008/0016258 A1   Jan. 17, 2008

Related U.S. Application Data

(62) Division of application No. 10/714,344, filed on Nov. 14, 2003, now Pat. No. 7,188,195.

(51) Int. Cl.
*G06F 13/28* (2006.01)
(52) U.S. Cl. ...................................................... 710/22
(58) Field of Classification Search .................... 710/22
See application file for complete search history.

(56) References Cited

U.S. PATENT DOCUMENTS 6,327,271 B1 *  12/2001  Gotesman et al. ........... 370/474

* cited by examiner

*Primary Examiner*—Alford W Kindred
*Assistant Examiner*—David E Martinez

(57) ABSTRACT

Methods, systems, and devices are provided for a media platform. One method includes receiving DMA requests for connecting media data traffic to DMA slots of a DMA memory module. Available DMA slots are determined from a pool of available DMA slots and allocated for media data traffic. DMA slots are released to the pool of available DMA slots when a DMA slot is no longer being used. The method further includes using a TMC proxy to connect media data traffic between the DMA memory module and a DSP software module based on assigned DMA slots.

10 Claims, 6 Drawing Sheets

DMA SLOT ALLOCATION

CROSS-REFERENCE TO RELATED APPLICATION

This application is a divisional of U.S. application Ser. No. 10/714,344, filed Nov. 14, 2003, now U.S. Pat. No. 7,188,195, the specification of which is herein incorporated by reference.

INTRODUCTION

Telecommunication systems, among others, can include networks of computing equipment. The computing equipment includes computer devices that have operating system software and associated application program interfaces (APIs) thereon. Telecommunication programs are generally written to execute with a particular API and operating system software to enable the equipment to function in different roles with the system or network architecture. For example, various telecommunications computing equipment can include programs to enable a given computing device to function as a media platform.

Media platforms as used in the telecommunications industry include hardware components, such as trunk lines, switches, routers, servers, and databases. Media platforms can also include software, application modules, firmware, and other computer executable instructions operable thereon. Modern media platforms are becoming more and more functional, or intelligent, in terms of the services they can provide in cooperation with the software tools that are provided thereon.

Certain functions on a media platform include the use of digital signal processing (DSP) modules and direct memory access (DMA) modules in connection with processing call signals. For example, DSP modules are used to analyze call signals, for processing and routing, using various algorithms such as Fast Fourier Transform. DMA modules include circuitry to route data (e.g., call signals or other media data traffic) on the media platform, for example, from one memory to another, without using a processor in every data transfer. Media data traffic includes voice, data, video type signals, etc. DMA slots associated with a DMA module can be used to connect either media channels and/or other bus slots on the media platform to the DMA module.

In some media platforms the allocation of DMA slots is handled by a proxy module in the operating system layer of the computing device. The DMA slots can be either directly assigned and hardwired to particular media channels and/or other bus slots on the media platform or the proxy module can allocate the slots on a first come first serve basis. Such proxy modules are designed to operate with a particular set of hardware, e.g., particular media cards having a particular type of media channels, and include software, e.g., computer executable instructions, to work with a particular type of operating system. For example, typical media platforms include a proxy module with APIs to allocate DMA slots to media channels of a synchronous optical network (SONET) type telecommunication media card (TMC).

A DS0 is one example of a media channel and represents one 64 Kilo bits per second (Kb/s) signaling channel. DS0s are the building blocks for TMCs. A SONET type TMC is the equivalent of 672 DS0s and provides a signal rate of 45.736 Mega bits per second (Mb/s). A T1 type TMC, by comparison, includes 4 trunks or spans for a total of 96 media channels. Twenty four (24) DS0s are provided in each T1 trunk or span for a signal rate of 1.544 Mb/s. An E1 type TMC, by comparison, includes 4 trunks or spans for a total of 124 media channels. Thirty one (31) DS0s are provided in each E1 trunk or span for a signal rate of 2.048 Mb/s. A J1 trunk or span of a J1 type TMC is the Japanese specification equivalent to a T1 trunk or span of a TMC.

Multiple T1, E1, and/or J1 type TMCs can be provided on a media platform. For example, seven T1 type TMCs would provide 672 media channels equivalent to the number on one SONET type TMC. However, the signals on the media channels of a SONET type TMC have a different rate and framing format from those of the media channels on a T1, E1, and/or J1 type TMC. Accordingly, a proxy module designed to allocate DMA slot connections to the media channels of a SONET type TMC is not suited to allocate DMA slot connections to the media channels of another type of TMC.

TMCs on a media platform can also include bus slots, as the same are known and understood by one of ordinary skill in the art, to bridge signal connections between multiple TMCs and/or be used for other network system functionality. For example, as known and understood by one of ordinary skill in the art, an H100 type of bus slot can be used to bridge connections between media channels on different TMCs such as between media channels on multiple T1 type TMCs. Media channels can be connected to bus slots on the TMC according to instructions executed by program applications and the use of APIs to communicate with the operating system of the media platform. An H100 bus is one example of a type of bus slot, known to those of ordinary skill in the art, which can be used to bridge connections between TMCs. And, as known by those of ordinary skill in the art, DS0s and bus slots on a TMC can be used as part of an integrated services digital network (ISDN). As mentioned above, a call signal is one form of media data traffic that can be transmitted over a media channel or bus slot on a media platform.

In the telecommunications field, newer programs are continually being written to provide additional telecommunication application services. Many of these newer programs are written to function with Linux type operating systems. Current media platforms do not provide a method to dynamically allocate DMA slots to media channels and bus slots with TMCs different from the SONET type TMC or in connection with a Linux type operating system.

DETAILED DESCRIPTION

Embodiments of the present invention provide programs and techniques to allocate direct memory access (DMA) slots with media channels and bus slots of a T1, E1 and/or J1 type TMC on a media platform. The programs embodiments described herein include a proxy module comprised of software to allocate in real time end points, e.g., media channels and bus slots, associated with a T1, E1, and/or J1 type TMC to DMA slots on the media platform. The real time allocation can enhance performance and switching capability on the media platform. Program embodiments allow for the DMA slot allocation instructions to be handled in a logic layer (referred to herein as "user" space) above the operating system layer (also referred to sometimes as "kernel" space) using a media provider module and a media group module which are defined further below. The media provider module and the media group module include access to application program interface (API) libraries. In various embodiments, the APIs in these libraries are used in connection with instructions executed by the media provider module and the media group module to allocate and release DMA slots in connection with T1, E1, and/or J1 type TMCs.

Logic layers, as used herein, include the operating system layer and application layers. The operating system layer sets the standards for application programs that run on the computing device. Application layers are considered to be logic layers which are located above the operating system layer. As used herein, "user" space, or "user-mode" implies a layer of code which is more easily accessible, e.g., includes open-source code, than the layer of code which is in the operating system layer or "kernel" space. As one of ordinary skill in the art will understand debugging is easier in the user-mode than the "kernel-mode", and problems are less fatal, e.g., almost anything going wrong in the kernel mode can lead to a full system crash whereas a similar problem in the user-mode might just require a process restart. Also, in Linux implementations, terms of the General Public License (GPL) mandate an open-source code, e.g., for the source code to be accessible. As will be indicated in connection with FIG. 2B, various embodiments place certain source code associated with a proxy module and a DSP module in the user space to enlarge the common code base and facilitate an added measure of ease in the development and a debug of new modules.

Figure 1:
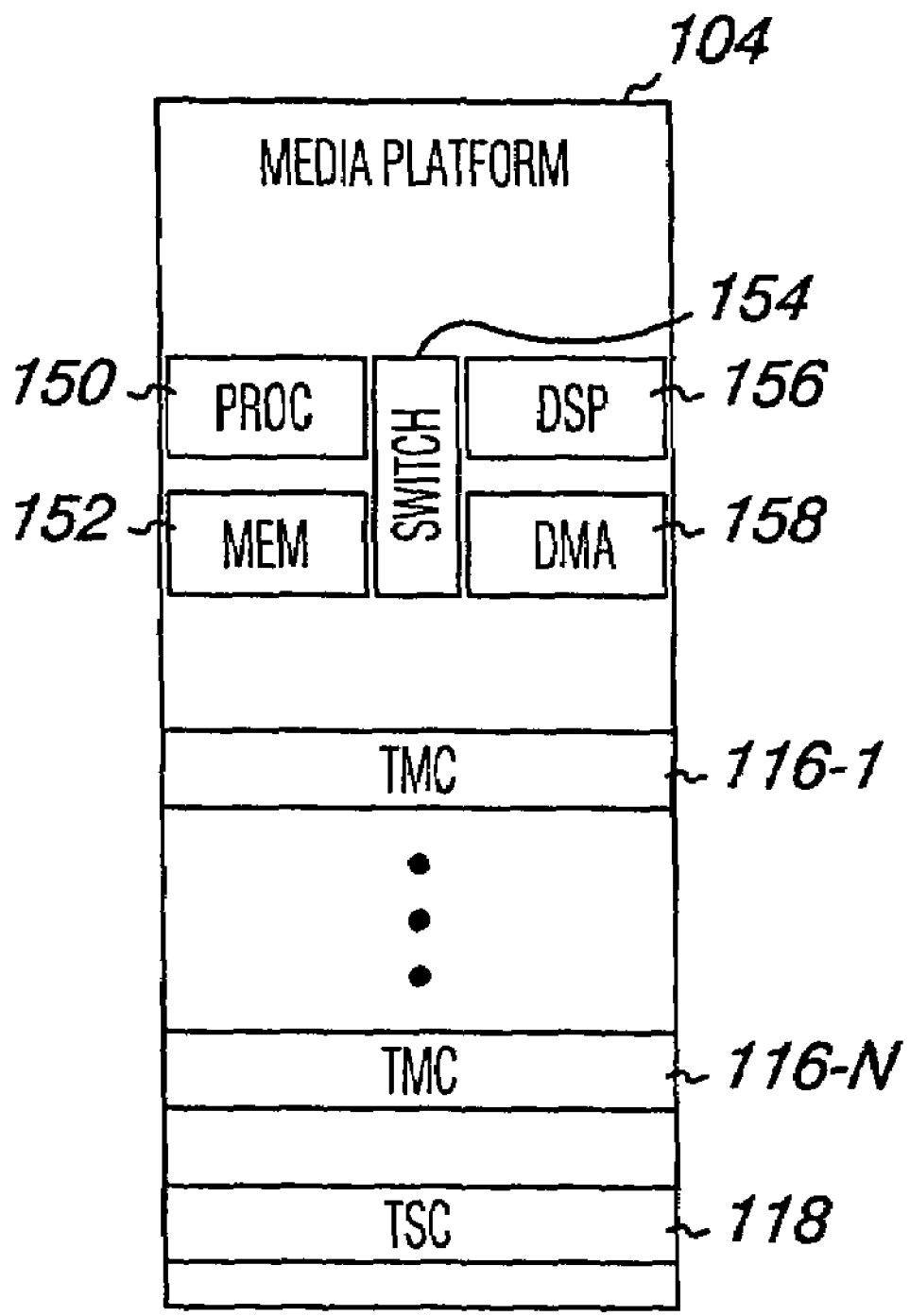
FIG. 1 is a block diagram embodiment of a media platform.

FIG. 1 is a block diagram embodiment of a media platform 104. Media platforms, such as shown in FIG. 1, provision, that is, provide or supply, telecommunication services to users. For example, a media platform 104 can receive a call signal originated by a local exchange carrier (LEC) and propagate the call signal to a switch 154 in order to route the call to an intended destination such as, by way of example, a home, another LEC, or a particular telecommunication service (e.g., voicemail, toll-free 800 call routing, interactive voice response applications, dual tone multiple frequency services, as well as virtual private network call routing). As mentioned above, certain telecommunication service functions on a media platform employ the use of DSP modules and DMA modules in connection with processing call signals.

A media platform 104 includes both hardware and software resources. Among these, the media platform can include a processor 150 and a memory 152. The memory 152 can store software (e.g., computer readable instructions and other programs) related to a variety of functions and telecommunication service applications executable on and by the media platform 104. The processor 150 can operate on computer executable instructions as part of the control logic for controlling operations of the media platform 104. Memory 152 can include non-volatile and volatile memory such as Flash memory, read only memory (ROM), random access memory (RAM), and optical memory, among others.

For illustration purposes, additional hardware and software resources are shown in FIG. 1 and can include a digital signal processing (DSP) module 156 and a direct memory access (DMA) module 158. The DSP module 156 and DMA module 158 are used in connection with instructions from memory 152, executable on processor 150. The DSP module 156 and DMA 158 work in conjunction with the processor 150 and memory 152 resources to provision a call signal to a particular media channel, as may be available on a telecom media card (TMC) 116, in order to complete the call signal's routing to an intended destination. FIG. 1 illustrates that a number of TMCs, shown as 116-1 through 116-N, can be included on a given media platform. A telecom media card (TMC) includes individual media channels, and the type of TMC determines the data rate and framing format for signals on those media channels. The TMCs 116-1 through 116-N can include like and/or different types of TMCs.

A switch 154, such as a switch in a publicly switched telephone network (PSTN), connects a call signal, or other media data traffic, on one media channel to another available media channel in order to continue routing the signal to the intended destination. A switch 154 can perform its function based on Signaling System 7 (SS7) control signals. SS7 is a well known dialogue-based communications protocol used for signaling and which may be used for communications with computing platforms such as a telecommunications media platform.

As mentioned above, a DSP module 156 can analyze call signals, for processing and routing, using various algorithms such a Fast Fourier Transform. A DMA module 158 on the media platform includes circuitry to route data (e.g., call signals or other media data traffic) on the media platform, for example, from one memory to another, without using the processor 150 in every data transfer. As described in the introduction, the media platform can include programs in an application layer created for use with the particular operating system type, e.g., Linux, Mac, Unix, etc., in an operating system layer of the media platform 104. In various embodiments the operating system type is a Linux operating system used in connection with T1, E1, and/or J1 type TMC hardware. Embodiments, however, are not so limited. For example, the operating system can include a Unix type operating system used in connection with T1, E1, and/or J1 type TMC hardware.

The software on the media platform, e.g., resident in memory 152 and executable by processor 150, can include instructions to record a voice message or audio file to a particular location in memory 152, e.g., a subscriber's voicemail box while employing the DSP and DMA modules. The software on the media platform can also receive call signals and interpret and execute the instructions encoded in the call signals, again using the memory and processor and other hardware such as the DSP module and DMA module described above, to play a recorded voice message from a particular voicemail box back across a media channel.

Examples of telecommunication service applications which can be executed on the media platform include voicemail, toll-free 800 call routing, interactive voice response applications (IVR), dual tone multiple frequency (DTMF) applications, as well as virtual private network call routing. IVR applications include applications which can process, e.g., using a DSP module, spoken voice signals and provide the call signal to a particular media channel 116 in order to complete the call signal's routing to an intended destination. DTMF services include applications which can process the type of audio signals that are generated from pressing buttons on a touch-tone telephone and provide the call signal to a particular media channel of a TMC 116 in order to complete the call signal's routing to an intended destination.

For example, software in memory 152 and executable by the processor 150 can retrieve a signal on a particular media channel on the TMC 116 and together with the associated hardware of the DSP module 156, DMA module 158, and/or switch 154 route the signal to an intended destination such as a voicemail box.

One of ordinary skill in the art will understand the manner in which program applications can include executable instructions to generate and/or retrieve call signals. Executable instructions can include control scripts and validation scripts. Control scripts are software used to drive call signals or play media files. Validation scripts can receive signals, e.g., media data traffic from the media channels, whether the signals are call signals, DTMF tones, or media files played to or from the media platform 104. By way of example and not by way of limitation, control scripts can be used to generate DTMF signals or play a media file and validation scripts can be used to retrieve DTMF signals or recorded media files. Control scripts and validation scripts can be written in a programming language such as Java scripts. However, embodiments are not limited to instructions written in a particular programming language. One of ordinary skill in the art will recognize that program application instructions can include requests for media channel, bus slot, and DMA slot connections.

Figure 2A:
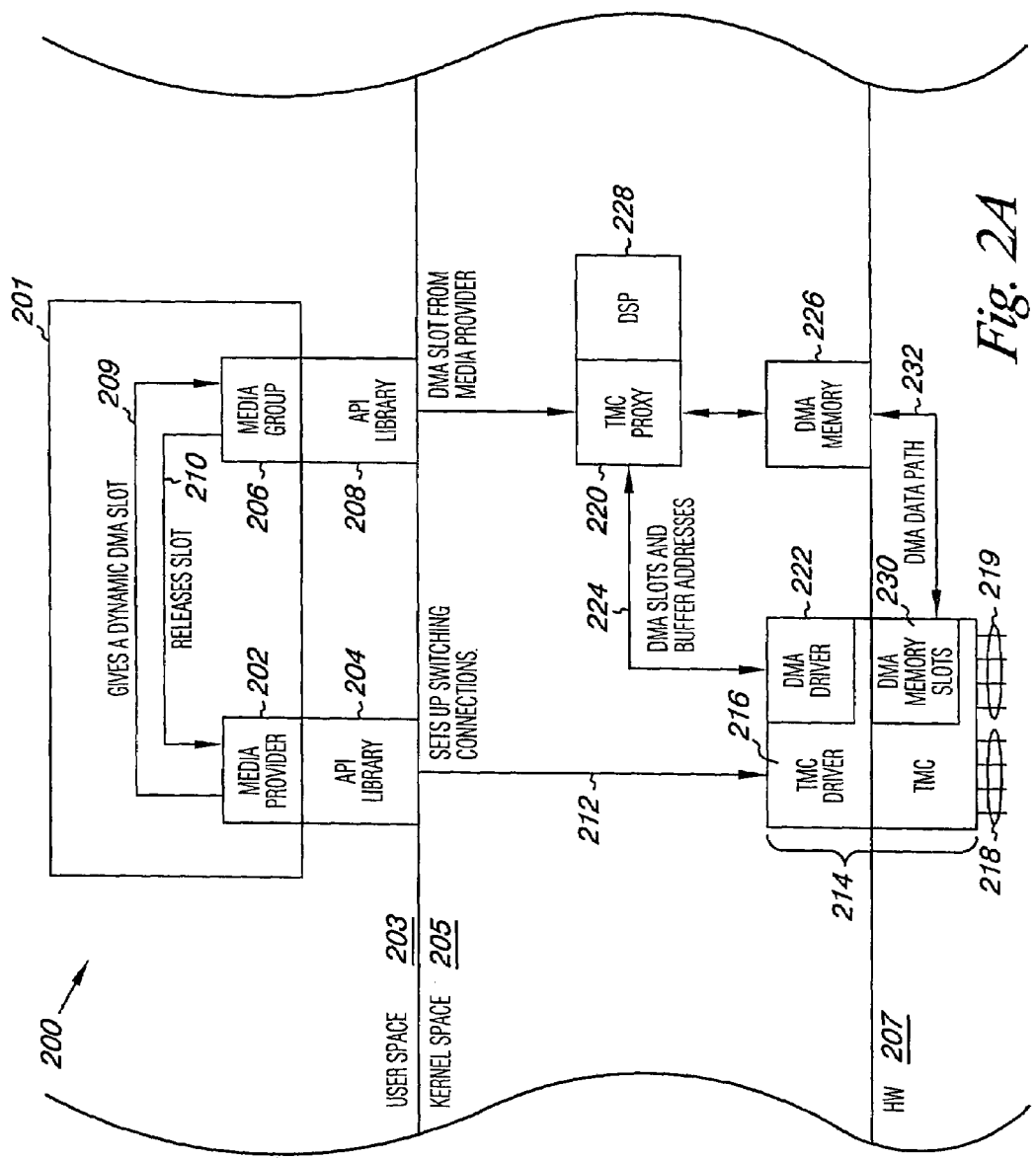
FIG. 2A illustrates a block diagram for one embodiment of logic layer connections on a media platform.

FIG. 2A illustrates a block diagram embodiment of logic layers and connections there between on a media platform 200. In various embodiments the media platform 200 can include a Linux, Unix, or Mac based operating system among others. In the embodiment of FIG. 2A, the media platform is illustrated divided into three different sections. These sections are illustrated as a user space 203 (e.g., an application layer), a kernel space 205 (e.g., an operation system layer) and a hardware space 207 (e.g., a TMC with associated media channels and bus slots).

A computing device having processor logic and memory, such as the media platform described herein, includes an operating system layer and an application layer to enable the device to perform various functions or roles. The operating system layer includes a master control program that runs the computing device. As understood by one of ordinary skill in the art, the master control program provides task management, device management, and data management, among others. The operating system layer contains communicates with program applications running thereon through a number of APIs. In other words the APIs include a language and/or message format used by an application program to communicate with the operating system. The language and/or message format of the APIs allow an operating system to interpret executable instructions received from program applications in the application layer and return results to applications.

APIs are implemented by writing function calls in the program, which provide the linkage to the required subroutine for execution. There are more than a thousand API calls in a full-blown operating system such as Windows, Mac, or Unix.

Program embodiments of the present invention provide APIs in memory, e.g., libraries in memory, and a new proxy module to enable program applications to allocate DMA slots to media channels and bus slots on a T1, E1, and/or J1 type TMC. As illustrated in FIG. 2A, the APIs are provided in connection with a media provider module 202 and a media group module 206 (described more below) to allocate and release DMA slots to the media channels and bus slots.

In FIG. 2A, the logical processor and memory interaction in the application layer has been grouped in block 201. The processor and memory interaction can represent the interaction of processor 150 and memory 152 as shown in FIG. 1. Block 201 includes the media provider module 202. The media provider module 202 can receive program application requests for media channel, bus slot, and direct memory access (DMA) slot connections (described below). The media provider module 202 has access to a first application program interface (API) library 204. The media provider module can retrieve APIs from the first API library 204 to execute the requests for connections to set up and tear down media channel, bus slot, and direct memory access (DMA) slot connections. In various embodiments the first API library is a Java Native Interface (JNI) library.

Block 201 further includes a media group module 206. Typically, the media group module 206 will receive a program application request to connect media channels, bus slots, and DMA slots. Program embodiments allow the media group module 206 to execute instructions to signal the media provider module 202 with a particular connection request. The media group module 206 has access to a second API library 208. The media group module 206 can receive DMA slot allocation instructions 209 from the media provider module 202. The media group module 206 can retrieve APIs from the second API library 208 to allocate DMA slots according to the DMA slot allocation instructions received from the media provider module 202. In various embodiments the second API library is a JNI and C++ library.

The media provider module 202 includes program embodiments which can track DMA slots which are currently being used and DMA slots which are currently not being used. In various embodiments the media group module 206 can identify when a DMA slot is no longer being used and can release or add the DMA slot to a pool of available DMA slots tracked by executable instructions in the media provider module 202. The media group module 206 can execute instruction to signal to the media provider module 202 that a DMA slot is once again available. That is, the media group module 206 can release a DMA slot and can communicate instructions 210 to the media provider module 202 that a particular DMA slot has been released.

As shown in FIG. 2A, using the first API library 204 the media provider module 202 can execute requests for connections to set up and tear down via control path 212 media channel, bus slot, and DMA slot connections on a telecom media card (TMC) 214. That is, the media provider module 202 can retrieve APIs from the first API library 204 to allocate application requests for media channel, bus slot, and direct memory access (DMA) slot connections with a first driver 216 associated with the TMC 214. A driver can include a hardware device (typically a transistor) that provides signals or electrical current to activate a transmission line. A driver can also include a program routine (e.g., can be a software driver) that links the operating system to a peripheral device or terminal connection, e.g., a media channel or bus slot. Written by programmers who understand the hardware's command language and characteristics, the driver contains the machine language necessary to perform the functions requested by the application. Typically, the operating system calls the driver, and the driver "drives" the device. The media channels are illustrated as 218. The bus slots are illustrated as 219. The media channel and bus slot connections on the TMC 214 can include T1 media channels and H100 bus slots for integrated services digital network connections. As one of ordinary skill in the art will appreciate, in such a configuration more than one T1 type TMC can be provided on the media platform 200 and the bus slots 219 can be used to connect media channels 218 on one TMC to media channels on another TMC (not shown for purposes of clarity).

FIG. 2A illustrates a TMC proxy module 220 coupled to a second, e.g., DMA driver 222 associated with the TMC 214. The TMC proxy module 220 can receive DMA slot allocation instructions from the media group module 206 and can communicate DMA slot and buffer address instructions 224 to the second driver 222. As shown in FIG. 2A a direct memory access (DMA) module 226 is coupled between the TMC proxy module 220 and the TMC 214. Media channels and bus slots are connected to DMA slots of the DMA module 226 based on the DMA slot and buffer address instructions.

As shown in FIG. 2A, the TMC proxy module 220 is further coupled to a digital signal processor (DSP) software module 228 to process media data traffic with the TMC 214. The digital signal processor (DSP) software module 228 is coupled to the TMC proxy module 220 to process media data traffic. The TMC proxy module 220 provides media data traffic access between the DSP software module 228 and the DMA memory module 226 coupled between the TMC proxy module 220 and the TMC 214. As shown in FIG. 2A, the DMA memory module 226 can be coupled to DMA memory slots 230 on the TMC 214 via circuitry providing a DMA data path 232.

FIG. 2A illustrates one embodiment for a non-Linux operating system based media platform, e.g., a Unix kernel implementation. In this embodiment the implementation has DMA media data traffic routed into kernel buffers, or operating system layer buffers (not shown). Such buffers are well known and will not be discussed in detail here so as not to obfuscate the patent. Program embodiments in FIG. 2A include instructions in the proxy module 220, as described above, to connect media data traffic into an input of the DSP module 228, described above. Program embodiments in FIG. 2A further include software instructions in the proxy module 220 which can count DMA completions in order to provide timing for DSP module processing. One of ordinary skill in the art will understand the manner in which software instructions can be used to count DMA completions.

Figure 2B:
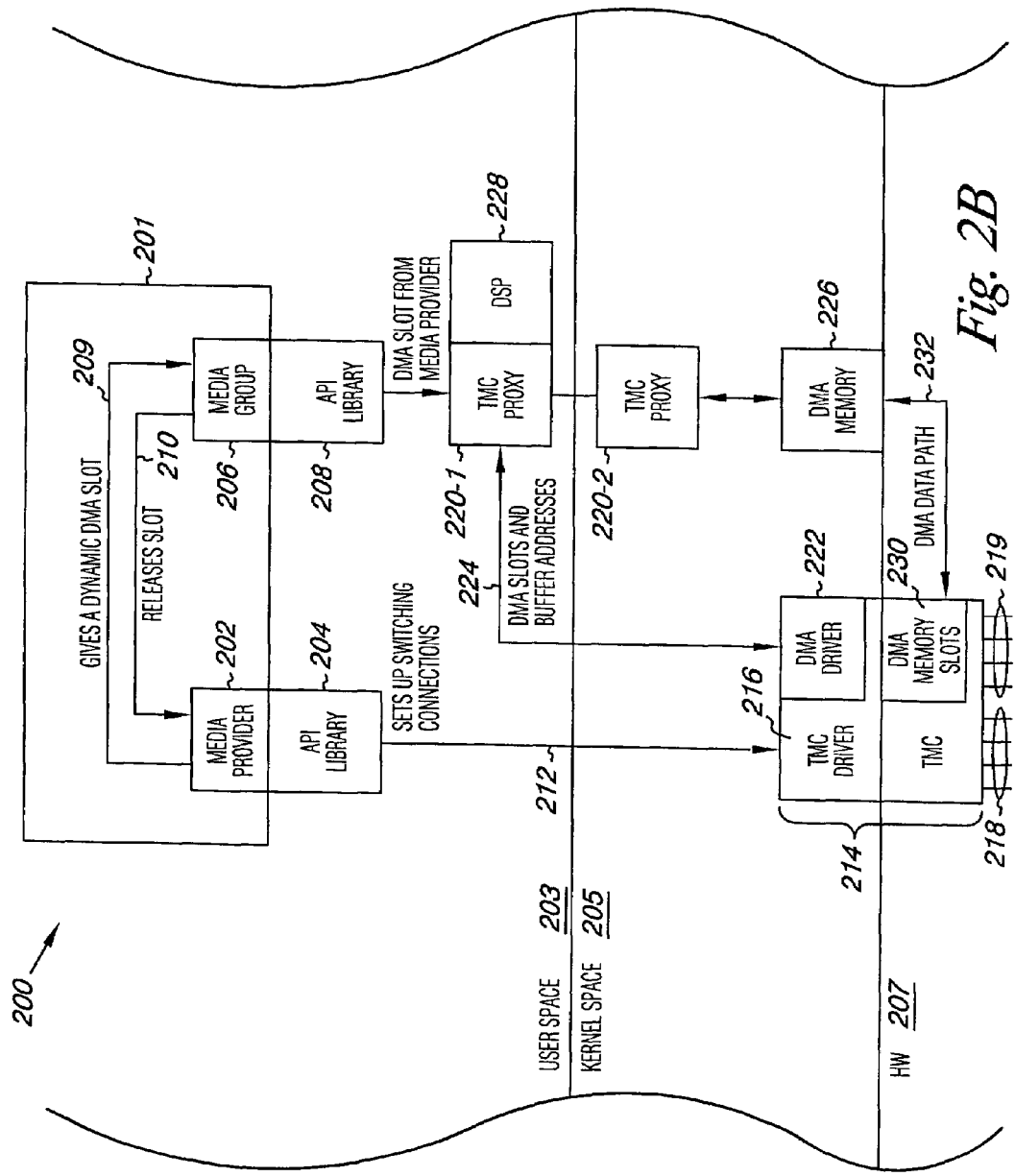
FIG. 2B illustrates a block diagram for another embodiment of logic layer connections on a media platform.

FIG. 2B illustrates another embodiment for a Unix, Linux, or other operating system based media platform. As illustrated in the embodiment of FIG. 2B, the DSP module 228 and a portion of the proxy module 220-1 is provided in the user space 203. As mentioned above, in Linux implementations, terms of the General Public License (GPL) mandate an open-source code, e.g., for the source code to be accessible. Thus, as illustrated in FIG. 2B, program embodiments, which include instructions in the DSP module 228 for processing media data traffic, are made available in the user space 203. Likewise, program embodiments, which include software instructions to count DMA completions are also made available in the portion of the proxy module 220-1 illustrated in the user space 203. The kernel portion of the proxy module 220-2 in FIG. 2B includes program embodiments which have software instructions to wait for the next DMA function to complete. One of ordinary skill in the art will understand the manner in which software instructions can be used to track and wait for a next DMA function to complete. In a Linux implementation, the kernel portion of the proxy module 220-2 is released as open-source. As one of ordinary skill in the art will appreciate, in the embodiment of FIG. 2B having the location of the DSP module 228 and a portion of the proxy module 220-1 provided in the user space 203 affords an added measure of ease in the development and a debug of new modules regardless of the operating system type in the media platform since, as identified earlier, debugging is easier in a user-mode application layer than in a kernel mode, e.g., operating system, layer.

In further reference to FIG. 2B the following examples are provided. However, embodiments of the invention are not limited to these examples. By way of example and not by way of limitation, in a Unix implementation DMA media data traffic is routed into user space buffers, e.g., a higher application layer, non-operating system (non-kernel) buffer. This is shown by DMA slots and buffer addresses 224 being routed to a user space portion of the proxy module 220-1. As before, the buffers themselves are well known to those of ordinary skill in the art and are not illustrated in detail here so as not to obfuscate the patent. Program embodiments in FIG. 2B include instructions in the user portion of the proxy module 220-1 to connect media data traffic from the buffers into the DSP module 228 for processing. Further, program embodiments include instructions in the user portion of the proxy module 220-1 to provide timing for the processing in the DSP module 228 and to wait for DMA completions so that they can be counted. Again, one of ordinary skill in the art will understand the manner in which software instructions can be used to count DMA completions. Program embodiments in FIG. 2B include instructions in the kernel portion of the proxy module 220-2 to wait for the next DMA to complete.

As another example in reference to FIG. 2B, e.g., a Linux implementation, DMA media data traffic is routed into kernel space buffers. Again, such buffers are well known to those of ordinary skill in the art and are not illustrated in detail here so as not to obfuscate the patent. In this implementation, program embodiments in FIG. 2B include instructions in the kernel portion of the proxy module 220-2 that map the kernel buffers to the user space so that they are visible in the user space 203. This is represented in FIG. 2B by the DMA slots and buffer addresses 224 being provided to the user space portion of the proxy module 220-1. Program embodiments in FIG. 2B include instructions in the user portion of the proxy module 220-1 to connect media data traffic from the buffers into the DSP module 228 for processing. As in the previous Unix example, program embodiments include instructions in the user portion of the proxy module 220-1 to provide timing for the processing in the DSP module 228 and to wait for DMA completions so that they can be counted. Again, one of ordinary skill in the art will understand the manner in which software instructions can be used to count DMA completions.

In all of the illustrated examples, the proxy module instructions which connect media data traffic into the DMA module identify, e.g., from the above described DMA slot allocation instructions, which DMA memory module, e.g., 226, should be used and which DMA memory slot or channel, e.g., DMA path 232 from among multiple DMA memory slots 230, to use within that module. The control path 212 is used according to instructions from the media provider module 202 to connect between the media channels 218, bus slots 219, and the DMA slots/channels 230/232.

Figure 3:
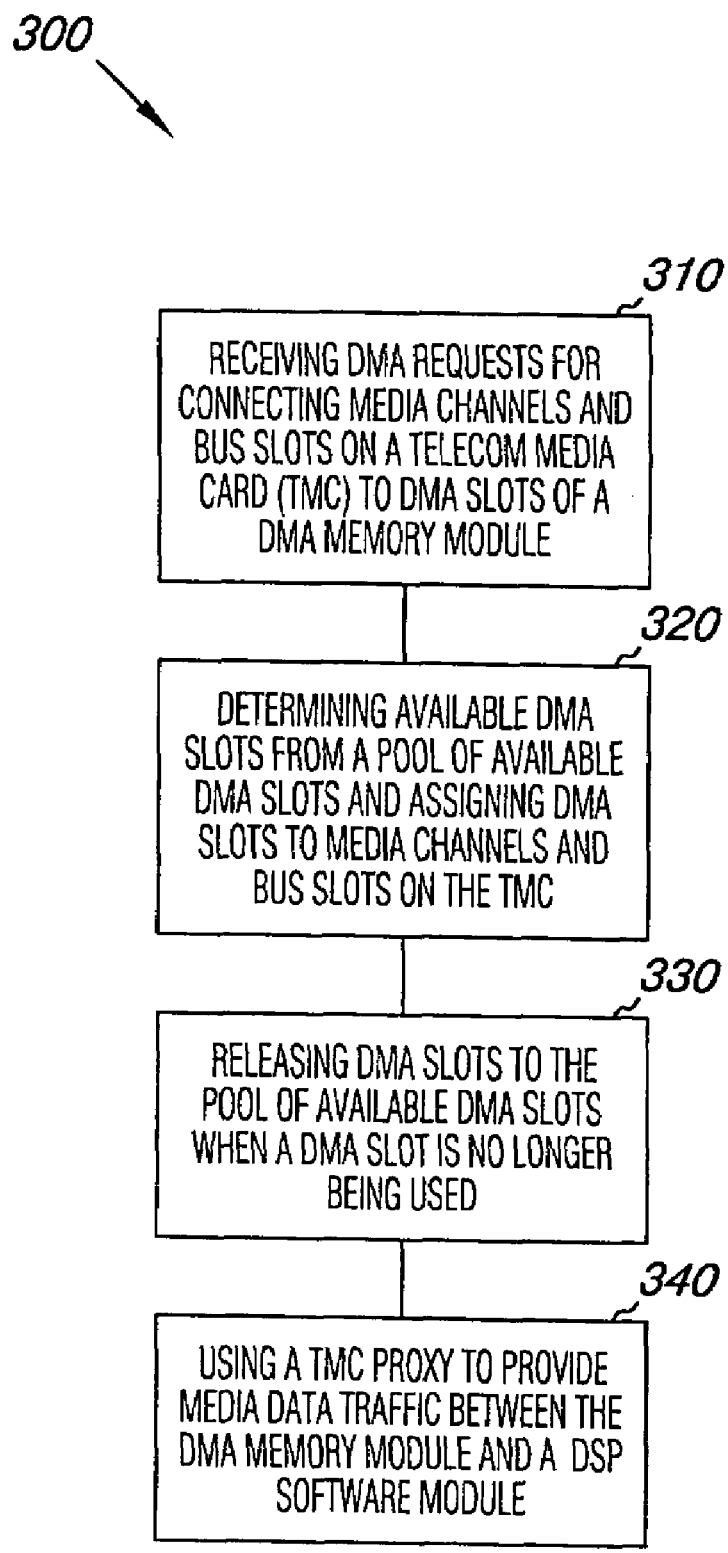
FIG. 3 is a block diagram illustrating a method embodiment for a media platform.
Figure 4:
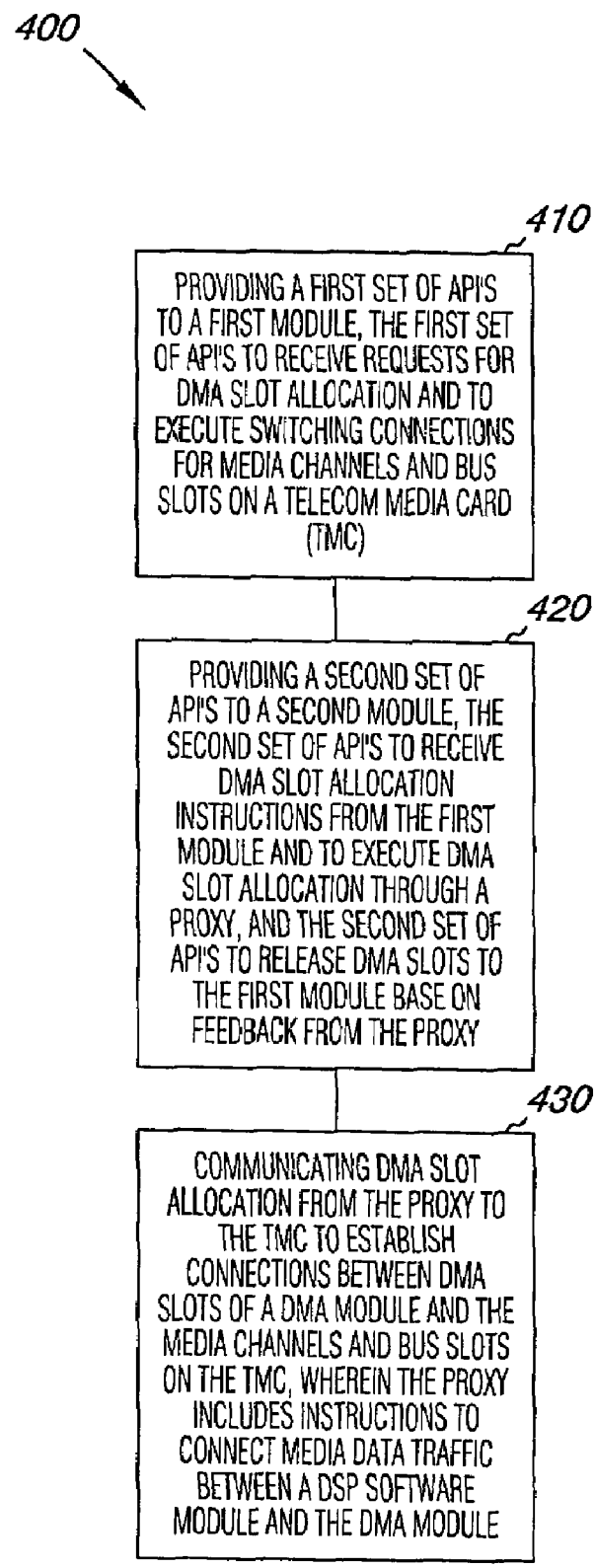
FIG. 4 is a block diagram illustrating another method embodiment for a media platform.

FIGS. 3 and 4 further illustrate various methods embodiments for a media platform. Unless explicitly stated, the method embodiments described herein are not constrained to a particular order or sequence. Additionally, some of the described method embodiments or elements thereof can occur or be performed at the same point in time. The embodiments can be performed by software programs (e.g., computer executable instructions), hardware, application modules, and the like, executable on the systems and devices shown herein or otherwise. Embodiments of the invention, however, are not limited to software written in a particular programming language. And, software, application modules and/or computer executable instructions, suitable for carrying out embodiments of the present invention, can be resident in one or more devices or locations or in many locations.

FIG. 3 is a block diagram illustrating a method embodiment for a media platform. As shown in FIG. 3 the method includes receiving DMA requests for connecting media channels and bus slots on a telecom media card (TMC) to DMA slots of a DMA memory module at block 310. One of ordinary skill in the art will recognize the manner in which program application instructions can include requests for media channel, bus slot, and DMA slot connections. The same is not described in more detail here so as not to obscure the embodiments of the invention. At block 320, the method includes determining available DMA slots from a pool of available DMA slots and assigning DMA slots to media channels and bus slots on the TMC. In various embodiments, the method includes program instructions provided to a media provider module to track and assign available DMA slots to media channels and bus slots on the TMC within a user space as the same has been defined above, e.g., provide allocation instructions. The program embodiments can further execute instructions to physically connect the available DMA slots to media channels and bus slots on the TMC. The program embodiments use a set of APIs associated with the media provider module to execute the above described instructions and connect available DMA slots to media channels and bus slots on the TMC via a control path such a control path 212 shown in FIGS. 2A and 2B.

In block 330, the method includes releasing DMA slots to the pool of available DMA slots when a DMA slot is no longer being used. As described in connection with FIGS. 2A and 2B, the method includes program instructions provided to a media group module to release DMA slots to the pool of DMA slots when a DMA slot is no longer being used. The program instructions of the media group module use a set of APIs provided to the media group module to execute DMA slot connections and to release DMA slots. As described in connection with FIGS. 2A and 2B, these program instructions are provided within a user space as the same has been defined above. And, as shown in block 340, the method includes using a TMC proxy to provide media data traffic between the DMA memory module and a DSP software module. In various embodiments, the method includes program instructions provided by the proxy module to connect media data traffic from buffers of the DMA into the DSP software module. As described in connection with FIGS. 2A and 2B, the program instructions of the proxy module execute to count DMA function completions and thereby provide timing for the DSP module processing by counting DMA completions. The program instructions can execute to track and wait for a DMA function to complete and provide an available DMA slot. The program instructions of the proxy module can provide the DMA slot connections and buffer address to the user space as shown in FIG. 2B. And, according to some embodiments as shown in FIG. 2B, program instructions for the DSP software module are likewise provided to the user space, e.g., in a Linux implementation to comply with open-source GPL mandates. According to the various embodiments, the program instructions are written to enable the dynamic allocation and real time connection of DMA slots to media channels and bus slots on T1, E1, and/or J1 type TMCs whether such TMCs are located on a Linux type media platform or other operating system type platform.

By way of further explanation, but not by way of limitation the following example is given. First a call signal is received over an SS7 signaling channel and a telephony channel, e.g., a T1 media channel or H100 bus slot, is chosen to carry the voice data. The same is well known and understood by one of ordinary skill in the art. A set of program application instructions on the media platform is chosen and launched in connection with the selected telephony channel.

As recognized by one of ordinary skill in the art, the instructions of the selected program application execute and can determine for a particular call signal what type of signal processing is to be applied. The selected program application instructions can execute to construct a set of signal processing requirements as the same are known to be performed on media platforms. For example, such a set of signal processing requirements may include control scripts and validation scripts, as the same have been mentioned above, to generate and/or detect DTMF signals, to play a media file such as an audio recording from a voice mailbox, to record to a media file such as to record a voice signal to a voice mailbox, to play text to speech data, and to recognize speech such as IVR, among other possibilities.

The program application instructions send this set of signal processing requirements to the media group module, as has been described in FIGS. 2A and 2B, which receives the same. The media group module executes instructions according to the program embodiments described herein to implement the request of the signal processing requirements.

When the media group module is activated by the receipt of a set of signal processing requirements, program instructions in connection with a telephony channel are provided to the proxy module. The proxy module executes program instructions to allocate a DMA slot and provide information on the DMA slot and associated buffer addresses to a DMA driver on the TMC. The DMA driver on the TMC connects the particular telephony channel, e.g., media channel or bus slot, to the allocated DMA slot. Additionally, program instructions execute on the proxy module to connect the DMA slot, associated with a DMA memory module, to the DSP module.

While the call is running, program instructions execute on the proxy module to receive and to send media data traffic in exchange between the DSP module and the DMA slot. The exchange of the media data traffic between the DSP module and the DMA slot employ the use of the processor and memory of the media platform to execute to the program instructions. These program instructions further execute to exchange the media data traffic between the DMA slot and the media channel and/or bus slot on the TMC.

As mentioned above, program embodiments are provided which further include instructions to deactivate the media group module from a particular telephony channel, e.g., media channel or bus slot, such as when a call is finished. Here, the program instructions of the proxy module execute to instruct the DMA driver on the TMC to disconnect the particular telephony channel, e.g., media channel or bus slot, from the particular DMA slot. Additionally, the program instructions on the proxy module execute to disconnect the DMA slot from the DSP module. The program instructions in the media group module also execute to instruct the media provider module that the particular DMA slot has been released.

FIG. 4 is a block diagram illustrating another method embodiment for a media platform. In FIG. 4 the method includes providing a first set of APIs to a first module, e.g., a media provider module, at block 410. The first set of APIs can receive requests for DMA slot allocation and can execute switching connections for media channels and bus slots on a telecom media card (TMC) as the same have been described herein. At block 420 the method includes providing a second set of APIs to a second module, e.g., a media group module. The second set of APIs can receive DMA slot allocation instructions from the first module and can execute DMA slot allocation through a proxy as the same has been described above. The second set of APIs can execute instructions to release DMA slots to the first module based on feedback from the proxy according to the methods described herein. At block 430 the method includes communicating DMA slot allocation instructions from the proxy to the TMC to establish connections between DMA slots of a DMA module and the media channels and bus slots on the TMC. In the various embodiments the proxy includes instructions to connect media data traffic between a DSP software module and the DMA module according to the allocated DMA slots. According to the various embodiments, the first and the second set of APIs, and associated program instructions, are written to enable the dynamic allocation and real time connection of DMA slots to media channels and bus slots on T1, E1, and/or J1 type TMCs. In various embodiments, the first and the second APIs, and associated program instructions, are written to enable the dynamic allocation whether the above mentioned TMCs are located on a Linux, Unix, Mac, or other operating system type platform.

Figure 5:
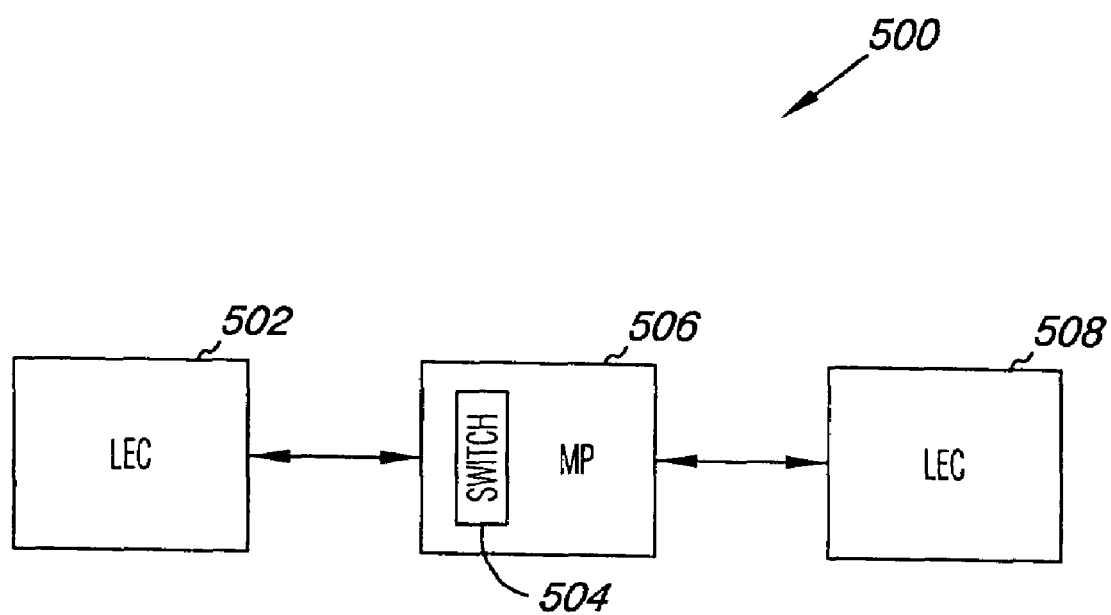
FIG. 5 is a block diagram embodiment of a telecommunications network including a media platform according to embodiments described herein.

FIG. 5 is a block diagram embodiment of a telecommunications network 500 which may include enhanced service applications for a telecommunications user. A telephone call may be placed by various telecommunication enabled devices, such as cell phones, multifunction devices (PDAs), and the like, which are to connect to a network 500. The network may include one or more of a variety of serving networks, including but not limited to, Publicly Switched Telephone Networks (PSTNs) Global System for Mobile communications (GSM) networks, American National Standards Institute (ANSI) networks, Public Wireless Local Area Networks (PWLANs), and/or Internet Protocol (IP) networks to name a few.

For purposes of illustration, a telephone call may be described as originating with a local exchange carrier ("LEC") network 502. The LEC propagates the call to a switch 504, such as an originating switch or a terminating switch which can reside on a telecommunications platform, or media platform 506. The originating switch processes the telephone call and routes the call to its destination 508. The destination may be in a different LEC, a call bank, or in a different type of telecommunications network, such as those mentioned above.

The media platform 506 is a media platform including the programs and techniques as the same have been described herein. The media platform 506 can be used as a proprietary telecommunications platform in a proprietary network. However, the media platform 506 can also be used as a private branch exchange (PBX), a switching center such as a mobile switching center (MSC), or a local exchange office, among others. As noted above, media platforms include hardware and software resources in the form of switches, routers, processors, digital signal processing (DSP) modules, memory, media cards, and the like which can operate on or according to computer executable instructions.

For example, the originating switch 504 may determine when processing for enhanced services is required for a telephone call. When processing for enhanced services is required, the originating switch opens a dialogue with the media platform, exchanging with the media platform 506 higher-level protocol messages embedded within lower-level SS7 protocol messages.

Signaling System 7 ("SS7") is a well known dialogue-based communications protocol used for signaling and which may be used for communications with computing platforms such as a telecommunications media platform. The data exchanged using the SS7 protocol couple between an originating switch and a media platform is commonly formatted into intelligent network application protocol ("INAP") messages. At the end of the exchange of INAP messages that comprises a dialogue between an originating switch 504 and a media platform 506, the media platform 506 directs the originating switch to connect the telephone call to a final destination 508 in order to facilitate the transfer of a media stream, e.g., voice, data, and/or video.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A media platform, comprising:
 a memory capable of storing program applications; a processor coupled to the memory and capable of executing the program applications;
 media provider module stored in the memory and including a first application program interface (API) library, the media provider module to retrieve APIs from the first API library to allocate application requests with a first driver associated with a telecom media card (TMC);
 a media group module stored in the memory and including a second API library, the media group module to retrieve APIs from the second API library based on DMA slot allocation instructions received from the media provider module; and
 a TMX proxy module stored in the memory and coupled to a second driver associated with the TMC, the TMC proxy module to receive DMA slot allocation instructions from the media group module.

2. The media platform of claim 1, further including a digital signal processor (DSP) software module coupled to the TMC proxy module to process media data traffic, and wherein the TMC proxy module provides media data traffic access between the DSP software module and a DMA module coupled between the TMC proxy module and the TMC.

3. The media platform of claim 2, wherein the DSP software module and a portion of the TMC proxy module are located in a user space.

4. The media platform of claim 2, wherein media channels and bus slots are connected to DMA slots of the DMA module based on DMA slot and buffer address instructions communicated to the second driver by the TMC proxy module.

5. The media platform of claim 1, wherein the APIs from the first API library are used to execute the requests for connections to set up and tear down media channel, bus slot, and DMA slot connections.

6. The media platform of claim 1, wherein the APIs from the second API library are used to allocate DMA slots, and wherein the media group module further includes program instructions to release DMA slots to the media provider module.

7. A media platform, comprising:
- a memory including a telecommunication program application;
- a processor coupled to the memory to execute the telecommunication program application;
- a telecom media card (TMC) including media channels and bus slots, the TMC to receive media channel, bus slot, and direct memory access (DMA) slot connection requests associated with the telecommunication program application;
- a direct memory access (DMA) module coupled to the TMC;
- a digital signal processor (DSP) software module coupled to the DMA module;
- means for allocating DMA slots to media channels and bus slots on the TMC; and
- means for providing media data traffic access between the DSP software module and a DMA module.

8. The media platform of claim 7, wherein means for allocating DMA slots to media channels and bus slots includes providing a first set of APIs to execute instructions to set up and tear down connections with T1 media channel and H100 bus slot connections through a first driver associated with the TMC and to execute DMA slot allocation instructions.

9. The media platform of claim 7, wherein means for providing media data traffic access between the DSP software module and a DMA module includes receiving DMA slot allocation instructions on a module having a second set of APIs, the second set of APIs to communicate DMA slot allocation instructions to the TMC and to release DMA slots when no longer being used.

10. The media platform of claim 9, further including a TMC proxy module coupled to a second driver associated with the TMC, the TMC proxy module to receive DMA slot allocation instructions from the module having a second set of APIs and to communicate DMA slot and buffer address instructions to the second driver.

* * * * *

UNITED STATES PATENT AND TRADEMARK OFFICE
CERTIFICATE OF CORRECTION

PATENT NO.        : 7,552,250 B2
APPLICATION NO.   : 11/702808
DATED             : June 23, 2009
INVENTOR(S)       : Barry K. Coffin et al.

It is certified that error appears in the above-identified patent and that said Letters Patent is hereby corrected as shown below:

In column 12, line 37, in Claim 1, before "media" insert -- a --, therefor.

In column 12, line 47, in Claim 1, delete "TMX" and insert -- TMC --, therefor.

Signed and Sealed this

Twenty-fourth Day of November, 2009

David J. Kappos
*Director of the United States Patent and Trademark Office*